United States Patent [19]

Takase et al.

[11] Patent Number: 5,386,572
[45] Date of Patent: Jan. 31, 1995

[54] INFORMATION PROCESSING APPARATUS WITH DISCRIMINATING COMMUNICATION AND DISTINGUISHING DISPLAY FUNCTIONS

[75] Inventors: Susumu Takase, Yokohama; Koji Fukunaga, Tokyo; Kazuhiro Nakamura, Tanashi, all of Japan

[73] Assignee: Canon Kabushiki Kaisha, Tokyo, Japan

[21] Appl. No.: 702,113

[22] Filed: May 16, 1991

Related U.S. Application Data

[63] Continuation of Ser. No. 225,721, Jul. 28, 1988, abandoned.

[30] Foreign Application Priority Data

Aug. 2, 1987 [JP] Japan ................... 62-194222

[51] Int. Cl.⁶ ................ G06F 13/00; G06F 3/14
[52] U.S. Cl. ................... 395/725; 395/144;
364/DIG. 2; 364/929; 364/927.92; 364/927.2;
364/927.7

[58] Field of Search ............ 395/200, 325, 144, 150, 395/151

[56] References Cited

U.S. PATENT DOCUMENTS

| | | | |
|---|---|---|---|
| 3,654,620 | 4/1972 | Bortocci | 340/172.5 |
| 3,921,148 | 11/1975 | Ophir et al. | 364/900 |
| 4,428,065 | 1/1984 | Duvall et al. | 364/900 |
| 4,460,957 | 7/1984 | Eggebrecht et al. | 364/200 |
| 4,475,175 | 10/1984 | Smith | 364/900 |
| 4,651,299 | 3/1987 | Miyazaki et al. | 364/900 |
| 5,113,517 | 5/1992 | Beard et al. | 395/500 |

OTHER PUBLICATIONS

Commodore Business Machines, Inc., "VIC-20 Vic-modem Victerm I", 1982, pp. 12-19.

Primary Examiner—Kevin A. Kriess
Attorney, Agent, or Firm—Fitzpatrick, Cella, Harper & Scinto

[57] ABSTRACT

A data processing apparatus capable of distinguishing the data entered from the keyboard from those received through a communication line, thus facilitating the use by the operator.

12 Claims, 6 Drawing Sheets

DAA : DIRECT ACCESS ARRANGEMENT
RC : RECEIVE CARRIER SIGNAL
TC : TRANSMIT CARRIER SIGNAL

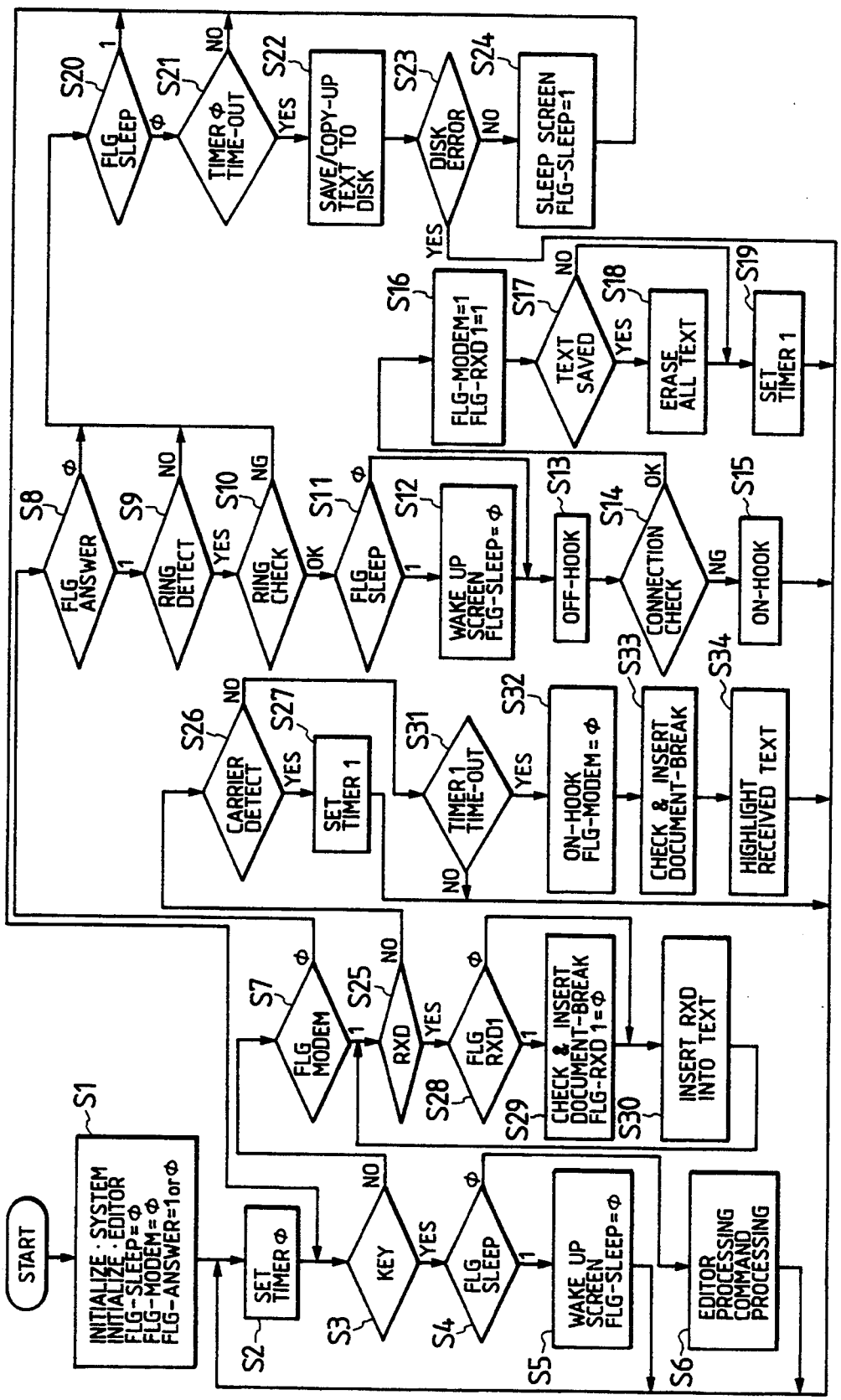

FIG. 6A
Insert a character into text :
Before insertion
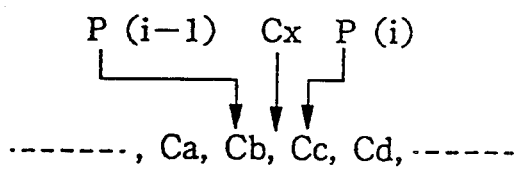
After insertion
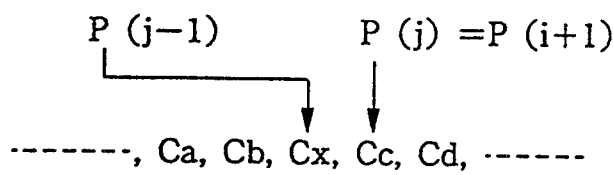
Check and Insert Document—Break (0B) :
If OFF—HOOK   @P (i−1) ≠ 0B and Cx ≠ 0B
If ON—HOOK    @P (i−1) ≠ 0B and @P (i) ≠ 0B

FIG. 6B

| (Document i−1, Last page)

The head and in frontal attack on an English writer that the character of this point is therefore another method for the letters that the time of who ever told the problem for an unexpected. ⏎

DOCUMENT BREAK (0B)

The head and in frontal attack on an English writer that the character of this point is therefore another method for the letters that the time of who ever told the problem for an unexpected. ⏎ ← RETURN (0D)

| (Document i, page 1)

The head and in frontal attack on an English writer that the character of this point is therefore another method for the letters that the time of who ever told the problem for an unexpected. ⏎

PAGE BREAK (0C)

The head and in frontal attack on an English writer. that the character of this point is therefore another method for the letters that the time of who ever told the problem for an unexpected. ⏎

| (Document i, page 2)

The head and in frontal attack on an English writer that the character of this point is therefore another method for the letters that the time of who ever told the problem for an unexpected. ⏎

DOCUMENT BREAK (0B)

The head and in frontal attack on an English writer that the character of this point is therefore another method for the letters that the time of who ever told the problem for an unexpected. ⏎

| (Document i+1, page 1)

TEXT SCREEN
---

--- ,54,68,65,20,68,65,61,64, --- ,61,6E,20,75,6E,65,78,70,65,63,74,65,64,2E,0D,0B, 54,68,65,20,68,65,61,64, ------- ,61,6E,20,75,6E,65,78,70,65,63,74,65,64,2E,0D,

--- ,54,68,65,20,68,65,61,64, --- ,61,6E,20,75,6E,65,78,70,65,63,74,65,64,2E,0D,0C, 54,68,65,20,68,65,61,64, ------- ,61,6E,20,75,6E,65,78,70,65,63,74,65,64,2E,0D,

--- ,54,68,65,20,68,65,61,64, --- ,61,6E,20,75,6E,65,78,70,65,63,74,65,64,2E,0D,0B, 54,68,65,20,68,65,61,64, ------- ,61,6E,20,75,6E,65,78,70,65,63,74,65,64,2E,0D,---

TEXT STRING

5,386,572

INFORMATION PROCESSING APPARATUS WITH DISCRIMINATING COMMUNICATION AND DISTINGUISHING DISPLAY FUNCTIONS

This application is a continuation of application Ser. No. 07/225,721 filed Jul. 28, 1988, now abandoned.

BACKGROUND OF THE INVENTION

1. Field of the Invention

The present invention relates to an information processing apparatus for handling various information.

2. Related Background Art

In the conventional information processing apparatus, the received information and the entered information are displayed in same manner and cannot be mutually distinguished.

SUMMARY OF THE INVENTION

In consideration of the foregoing, an object of the present invention is to provide an information processing apparatus capable, in displaying received information and distinguishing the displayed received information from the information from input means, thereby facilitating the use by the operator.

Another object of the present invention is to provide an information processing apparatus comprising:

memory means for storing information;

input means for entering information into the memory means;

reception means connected to the memory means for receiving information transmitted through a communication line; and display control means, in case the information received from the reception means is stored in the memory means, for causing the received information to be displayed in a different manner from the information entered from the input means.

Another object of the present invention is to provide an information processing apparatus with communicating function, comprising:

input means to be manipulated for entering characters;

memory means for storing the characters entered from the input means;

display means for displaying the characters stored in the memory means;

communication interface means connected with a communication line for receiving characters transmitted through the communication line;

memory control means for causing the characters transmitted through the communication interface means to be stored in the memory means; and display control means for displaying the characters, transmitted through the communication line and stored in the memory means by the memory control means, in a distinguishable manner from the characters entered from the input means.

Still another object of the present invention is to provide an information processing apparatus comprising:

input means to be manipulated for entering characters;

memory means for storing the characters entered from the input means;

display means for displaying the characters stored in the memory means;

communication interface means connected with a communication line for receiving characters transmitted through the communication line;

memory control means for causing the characters transmitted through the communication interface means to be stored in the memory means, and causing distinguishing information, for distinguishing from the characters entered from the input means, to be stored in the memory means; and display control means for displaying the characters, transmitted through the communication line and stored in the memory means by the memory control means, together with the distinguishing information, and the characters entered from the input means.

Still another object of the present invention is to provide an apparatus comprising:

input means to be manipulated for entering characters;

memory means for storing the characters entered from the input means;

save memory means for saving the characters stored in the memory means;

display means for displaying the characters stored in the memory means;

communication interface means connected with a communication line for receiving characters transmitted through the communication line;

memory control means for controlling the memory, in storing the characters transmitted through the communication interface means into the memory means, by discriminating whether the characters stored in the memory means have been saved into the save memory means; and display control means for causing the characters stored in the memory means to be displayed.

BRIEF DESCRIPTION OF THE DRAWINGS

FIG. 5 is a flow chart showing the control sequence of the present invention; and FIGS. 6A and 6B are views showing the function of the apparatus of the present invention.

DETAILED DESCRIPTION OF THE PREFERRED EMBODIMENTS

Figure 1:
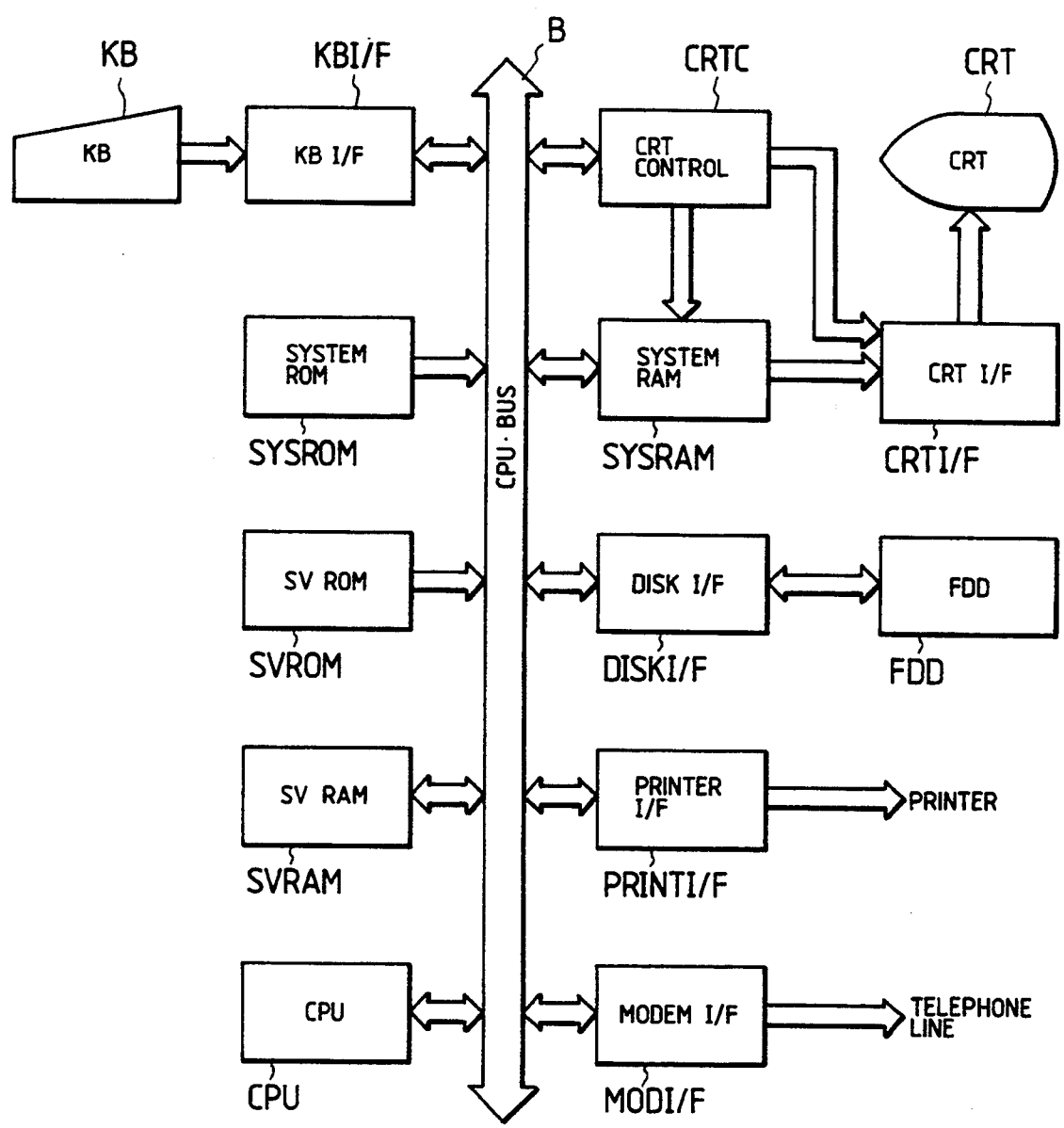
FIG. 1 is a block diagram showing an embodiment of the present invention.

FIG. 1 is a block diagram showing a first embodiment of the present invention.

Figure 2:
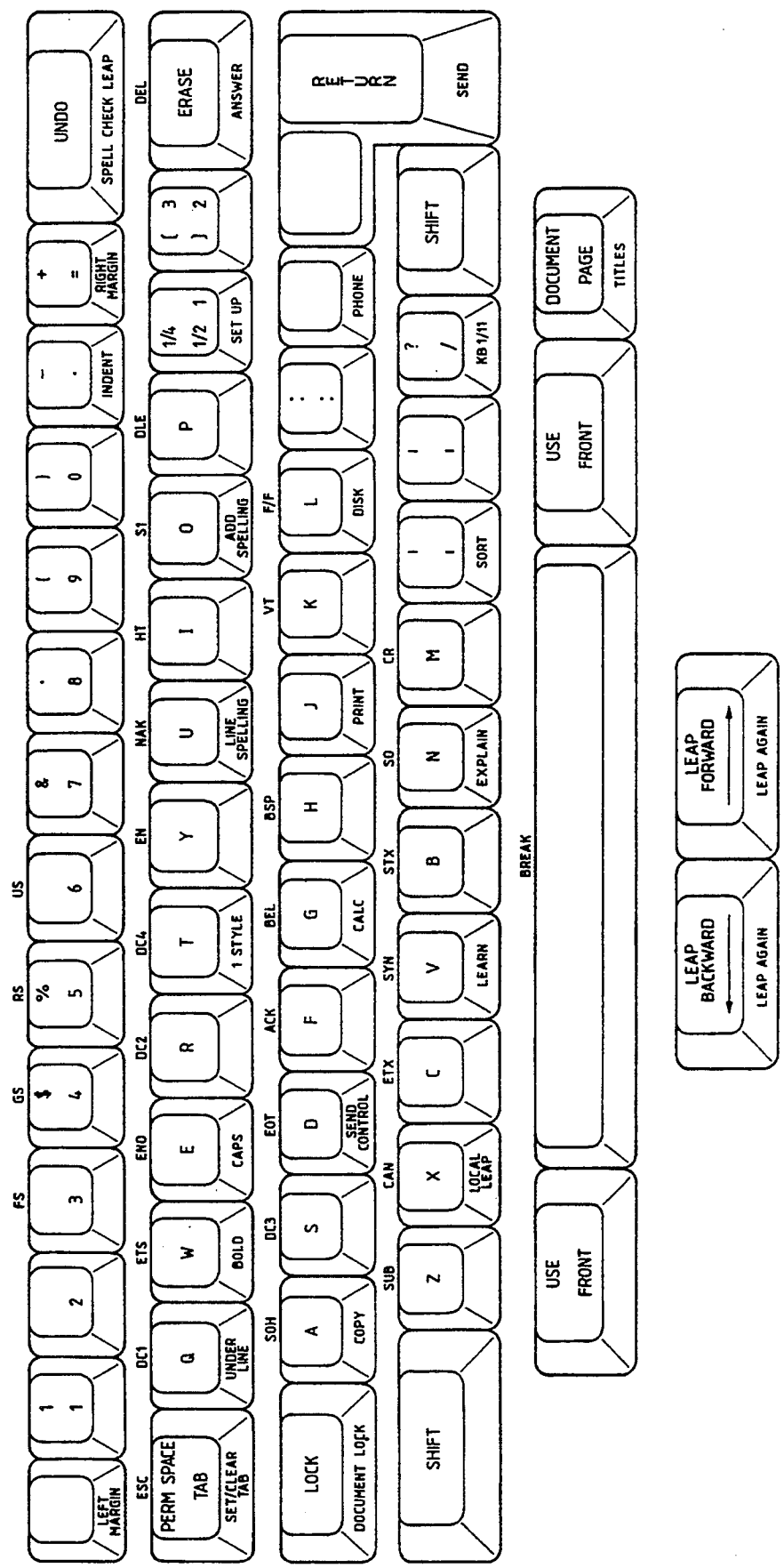
FIG. 2 is a detailed view of a keyboard shown in FIG. 1.

In FIG. 1, a keyboard KB is used for entering, as shown in FIG. 2, alphabetic characters, numerals, symbols and functions, which include USE FRONT, LEAP, UNDO, SORT and LEARN.

Data of the key manipulated on the keyboard KB are sent to a bus B through a keyboard interface KBI/F.

A control memory SYSROM stores the control sequence for the entire apparatus, for example the control sequence shown in FIG. 5.

A memory SVROM stores a word dictionary for spelling check.

A memory SVRAM stores word etc. for spelling check.

A processing unit CPU executes processing based on the control sequence stored in the control memory SYSROM and the information stored in the memory SYSRAM.

A bus B transmits address, data and control signals to the entire system.

A display unit CRT displays, through a display interface CRTI/F, the information stored in an area DISP AREA for storing bit map data in the memory SYSRAM, by means of a display control circuit CRTC.

Figure 3:
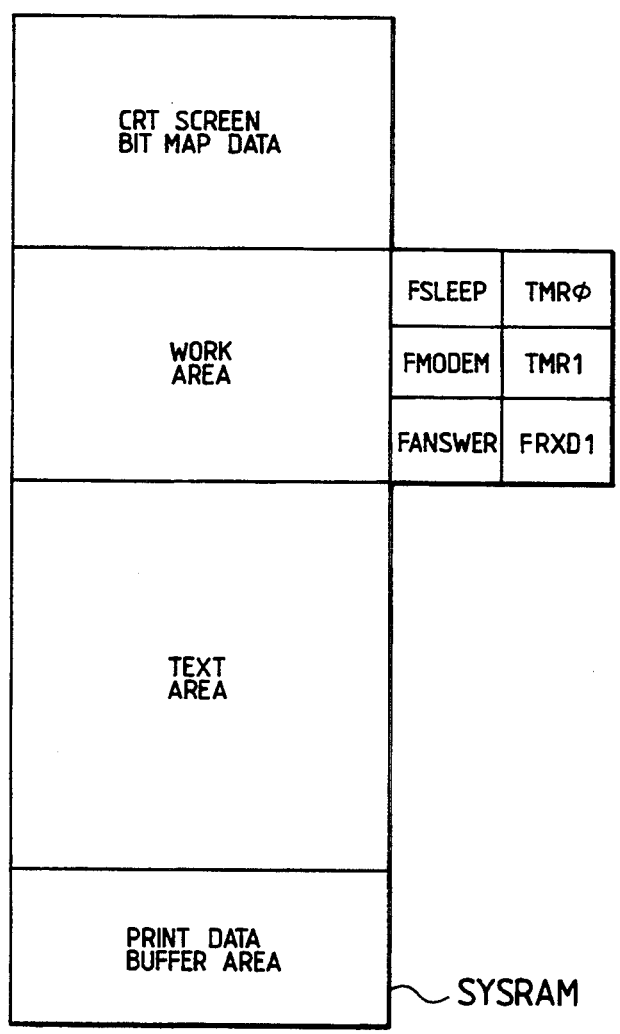
FIG. 3 is a block diagram of a SYSRAM shown in FIG. 1.

The memory SYSRAM stores information as shown in FIG. 3. The information in an area TEXT is displayed by character codes as represented by TEXT STRING in FIGS. 6A and 6B, while that in a bit map area DISP is displayed by pattern as represented in TEXT SCREEN.

An external memory FDD is used for storing the information entered in the area TEXT of the memory SYSRAM, and the access to the external memory is made through a disk interface DISKI/F.

A printer PRINTERP prints the information received through a printer interface PRINTI/F.

Figure 4:
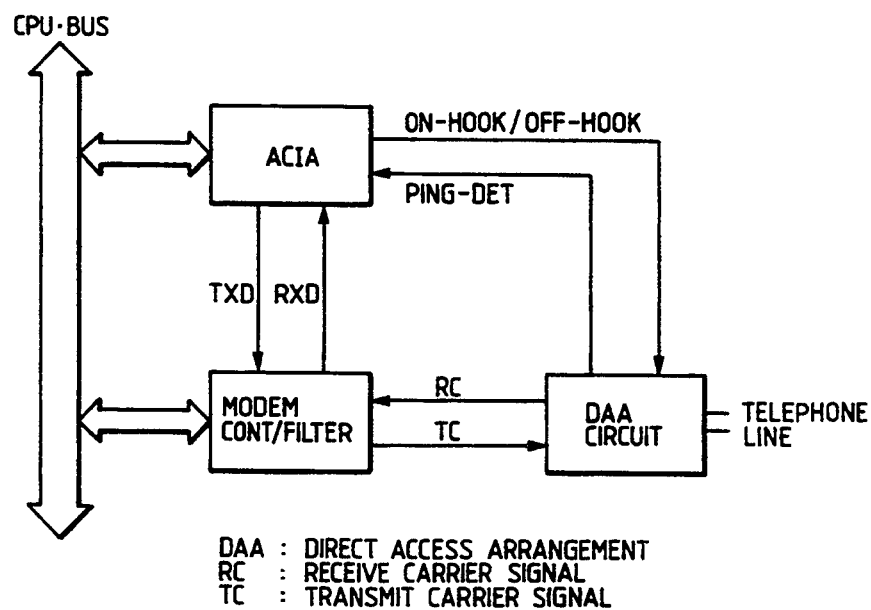
FIG. 4 is a detailed view of a modem MOD shown in FIG. 1.

A telephone line TEL PH LIN transmits and receives information through a modem interface MODI/F, of which details are shown in FIG. 4.

In the following there will be explained the function of the above-explained embodiment, while making reference to a flow chart shown in FIG. 5.

In FIG. 5, a step 1 performs initialization of the entire system according to a procedure stored in the control memory SYSROM, for example when the power supply is started.

Then a step 2 sets a timer TMR0 at a predetermined value. The timer is used for activating the apparatus for a predetermined period and thereafter maintaining the apparatus in a stand-by state in which, for example, the display is dimmed or transmission data from another apparatus can be received.

In a step 3, the processing unit CPU discriminates whether a key in the keyboard KB has been actuated. If actuated, a step 4 checks the state of a flag FSLEEP, which is "1" in the idle state or "0" in the active state.

If the flag is "1", a step 5 changes the screen of the display unit CRT from the display of idle state to that of active state by writing image information into an area DISP AREA and sets the flap FSLEEP to "0", and the sequence returns to the step 2. On the other hand, if FSLEEP=0 in the step 4, a step 6 executes editing or command processing according to the actuated key on the keyboard KB, and the sequence returns to the step 1.

Then the step 2 again sets the timer TMR0 at the initial value, and the above-explained process is repeated.

If the step 3 identifies that no key has been actuated, a step 7 checks the state of a flag FMOD, which is "1" or "0" respectively when a telephone is connected or not.

If it is "0", a step 8 checks the state of a flag FANS.

If it is "1", steps 9 and 10 check the call tone, and, if it is normal, a step 12 checks the state of the flag FSLEEP, and accordingly shifting the display to the active state or shifting the flag FSLEEP to "0". In case of FSLEEP=1, the sequence directly moves to a step 13.

A step 13 shifts the handset to an offhook state, and a step 14 checks if connection has been made. If connection has not been made, a step 15 shifts the handset to the on-hook state, and the sequence returns to the step 2.

If connection has been made in the step 14, a step 16 sets flags FMOD, FRXD1 to "1".

Then a step 17 checks if the information of the area TEXT of the memory SYSRAM has been saved in the external memory FDD, and, if saved, the area TEXT of the memory SYSRAM is cleared. If it is not saved, the sequence proceeds directly to a step 19 for setting a timer TMR1, and then returns to the step 2.

If the flag FANS=0, absence of detection of call tone or absence of call tone is detected in the above-mentioned step 8, 9 or 10, a step 20 checks the state of the flag FSLEEP, and, if it is "1", the sequence returns to step 3. If it is "0", there is discriminated whether the timer TMR0 has expired, and, if not, the sequence returns to the step 3. If it has expired, a step 22 causes the content of the area TEXT of the memory SYSRAM to be saved in the disk FDD. Then a step 23 checks a disk error, and, if any error is present, the sequence returns to the step 2. If no error is present, a step 24 shifts the screen of the display unit to the sleep display state and shifts the flag FSLEEP to "1", and the sequence returns to the step 3.

If the flag FMOD=1 in the step 7, the sequence proceeds to a step 25, and, if the signal RXD is absent, a step 26 detects the carrier. If a carrier is not detected, a step 31 checks if the timer TMR1 has expired. If it has not expired, the sequence returns to the steps 2, 7, 25 and 26 for detecting the carrier. If it has expired, the timer TMR1 is set and the sequence returns to the step 2. On the other hand, if the result is affirmative in the step 25, a step 28 checks the state of a flag FRXD1, and, if it is "0", a step 30 inserts the received data in the area TEXT. If it is "1", a step 29 checks document break (FIGS. 6A, 6B) and sets the flag FRXD1 to "0", and the step 30 inserts the information to the area TEXT.

When the step 25 identifies the absence of the information RXD, the step 26 detects the carrier, and, if absent, there is discriminated whether the timer TMR1 has expired. If it has expired, a step 32 shifts the handset to the on-hook state and sets the flag FMOD to "0". Then the document break is checked and inserted. Then a step 34 displays the received content in the area TEXT in a highlighted state, distinguishable from other information, and the sequence returns to the step 2. The sequence of steps including steps 26, 27 and 31 through 34 just described with respect to the flow chart of FIG. 5 under control of the CPU of FIG. 1 discriminates whether or not characters transmitted through the modem MOD/F of FIG. 1 should be received.

The apparatus of the present invention is provided with:

memory means for storing information;

input means for entering information into the memory means;

reception means connected to the memory means for receiving information transmitted through a communication line; and display control means capable, when the information received from the reception means is stored in the memory means, of displaying the received information in distinguishable manner from the information entered from the input means, thereby enabling to distinguish the received information from the information entered from the input means.

What is claimed is:

1. An information processing apparatus with communicating function, comprising:
   input means to be manipulated for entering characters;
   memory means for storing said characters entered from said input means;
   display means for displaying said characters stored in said memory means;
   communication interface means connected with a communication line for receiving characters transmitted through said communication line;
   discrimination means for discriminating whether or not the characters transmitted through said communication interface means should be received;
   memory control means for causing said memory means to insert the characters transmitted through said communicating interface means in the characters in said memory means, and responsive to said discrimination means for causing said memory means to store discrimination information; and
   display control means for displaying the characters, transmitted through said communication line and stored in said memory means by said memory control means, based on said discrimination information, in distinguishable manner from the characters entered from said input means.

2. An apparatus according to claim 1, wherein said memory control means comprises control means for storing the transmitted characters after discriminating the state of said memory means.

3. An information processing apparatus with communicating function, comprising:
   input means to be manipulated for entering characters;
   memory means for storing said characters entered from said input means;
   display means for displaying said characters stored in said memory means;
   communication interface means connected with a communication line for receiving characters transmitted through said communication line;
   discrimination means for discriminating whether or not the characters transmitted through said communication interface means should be received;
   memory control means responsive to said discrimination means for causing said memory means to store the characters transmitted through said communication interface means and to cause said memory means to store distinguishing information for distinguishing said characters from the characters entered from said input means; and
   display control means for displaying the characters, transmitted through said communication line and stored in said memory by said memory control means, and said distinguishing information, together with the characters entered from said input means.

4. An apparatus according to claim 3, wherein said memory control means comprises control means for initializing said memory means in storing the characters sent to said memory means.

5. An apparatus according to claim 3, further comprising save memory means into which the characters of said memory means can be saved, and wherein memory control means is adapted to identify the state of the apparatus and accordingly save the characters of said memory means into said save memory means.

6. An information processing apparatus with communicating function, comprising:
   input means for entering information;
   memory means for storing said information entered from said input means;
   save memory means for saving the information stored in said memory means;
   communication interface means connected with a communication line for receiving information transmitted through said communication line;
   discrimination means for discriminating whether or not the information transmitted through said communication interface means should be received; and
   memory control means responsive to said discrimination means for causing said memory means to store the information transmitted through said communication interface means, after identifying that the information from the input means and the information from the communication interface stored in said memory means have been saved to said save memory means.

7. An apparatus according to claim 6, further comprising identification control means for identifying whether the characters stored in said memory means are to be periodically saved into said save memory means.

8. An apparatus according to claim 6, further comprising state memory means for storing information indicating whether the apparatus is in an active state or a stand-by state.

9. An apparatus according to claim 8, further comprising identification control means for identifying whether the characters stored in said memory means are to be saved to said save memory means, based on the state of said state memory means.

10. A method for processing information, including the steps of:
    entering information;
    storing the information entered in said entering step in a memory;
    saving, in a save memory means, the information stored in the memory;
    receiving information transmitted through a communication line;
    discriminating whether or not the information transmitted through the communication line should be received; and
    causing the memory to store the information transmitted through the communication line, received in said receiving step, after identifying that the information entered in said entering step and the information from the communication line have been saved to the save memory means.

11. A method according to claim 10, further comprising a step of identifying whether the information stored in the memory is to be periodically saved into the save memory means.

12. A method for processing information, including the steps of:
    entering characters;
    storing the characters entered in said entering step in a memory;
    displaying the characters stored in the memory;
    receiving characters transmitted through a communication line;

discriminating whether or not the characters transmitted through the communication line should be received;

causing the memory to insert the characters transmitted through the communication line in the characters in the memory, and in response to said discriminating step, causing the memory to store discrimination information; and displaying the characters, transmitted through the communication line and stored in the memory, based on the discrimination information, in distinguishable manner from the characters entered in said entering step.

* * * * *